(No Model.) 3 Sheets—Sheet 1.
D. W. CURTIS.
AUTOMATIC MILK WEIGHING APPARATUS.

No. 565,437. Patented Aug. 11, 1896.

Attest
C. C. Burdine
J. M. Pond

Inventor
D. W. Curtis
by Dodge & Sons,
Att'ys.

(No Model.)  
3 Sheets—Sheet 2.

D. W. CURTIS.
AUTOMATIC MILK WEIGHING APPARATUS.

No. 565,437. Patented Aug. 11, 1896.

Attest  
C. C. Burden  
J. M. Pond

Inventor  
D. W. Curtis  
by Dodge & Sons,  
Att'ys.

(No Model.)  3 Sheets—Sheet 3.

D. W. CURTIS.
AUTOMATIC MILK WEIGHING APPARATUS.

No. 565,437. Patented Aug. 11, 1896.

Attest:
C. C. Buechner
J. M. Pond

Inventor
D. W. Curtis,
by Dodge & Sons,
Attys.

United States Patent Office.

DAVID W. CURTIS, OF FORT ATKINSON, WISCONSIN.

AUTOMATIC MILK-WEIGHING APPARATUS.

SPECIFICATION forming part of Letters Patent No. 565,437, dated August 11, 1896.

Application filed April 30, 1896. Serial No. 589,726. (No model.)

*To all whom it may concern:*

Be it known that I, DAVID W. CURTIS, a citizen of the United States, residing at Fort Atkinson, in the county of Jefferson and State of Wisconsin, have invented certain new and useful Improvements in Automatic Milk-Weighing Apparatus, of which the following is a specification.

This invention relates to machines or apparatus for automatically measuring or weighing fluids, it being designed especially for measuring milk at creameries.

The invention consists in the combination and arrangement of a pair of scales, a receiving-tank, with pipes and valves arranged to be operated automatically by a weight or weights inserted at a certain opening, somewhat on the principle of what are known as the "penny-in-the-slot" machines now in common use, all as hereinafter more fully set forth.

Figure 1:
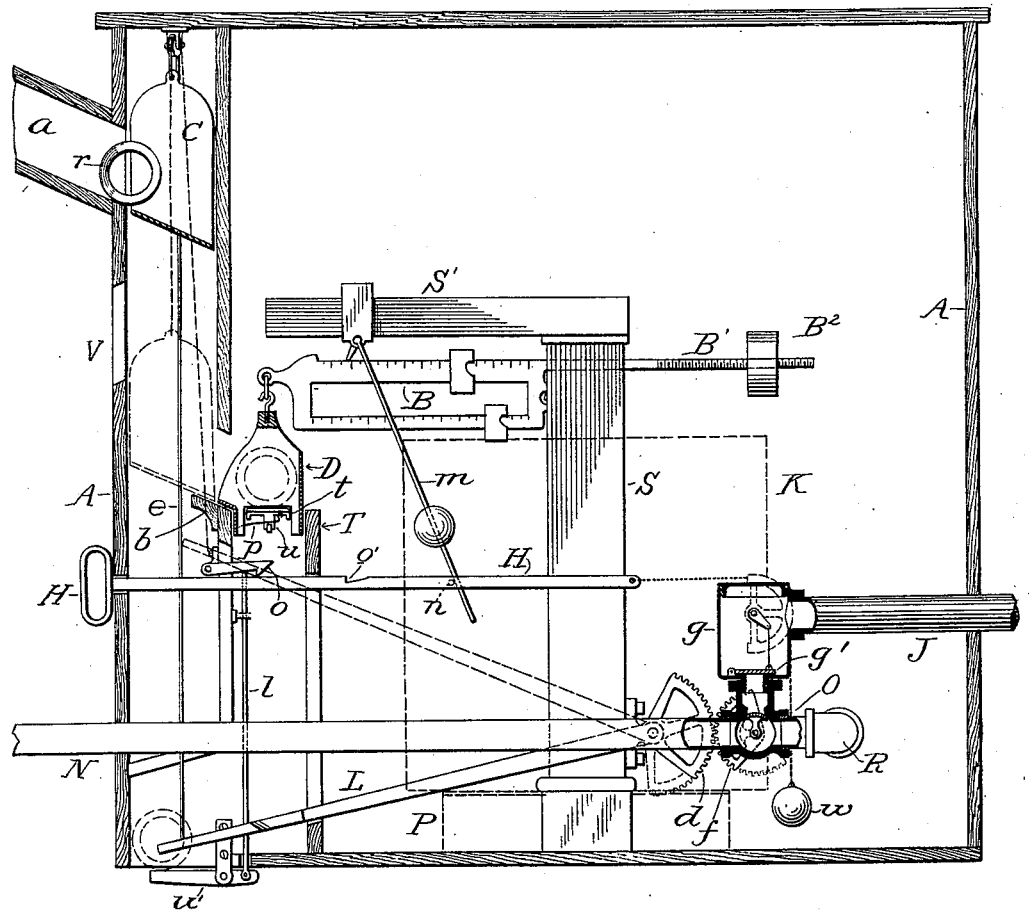
Figure 5:
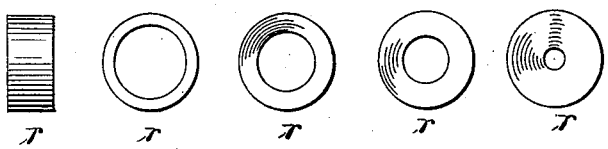
Figure 2:
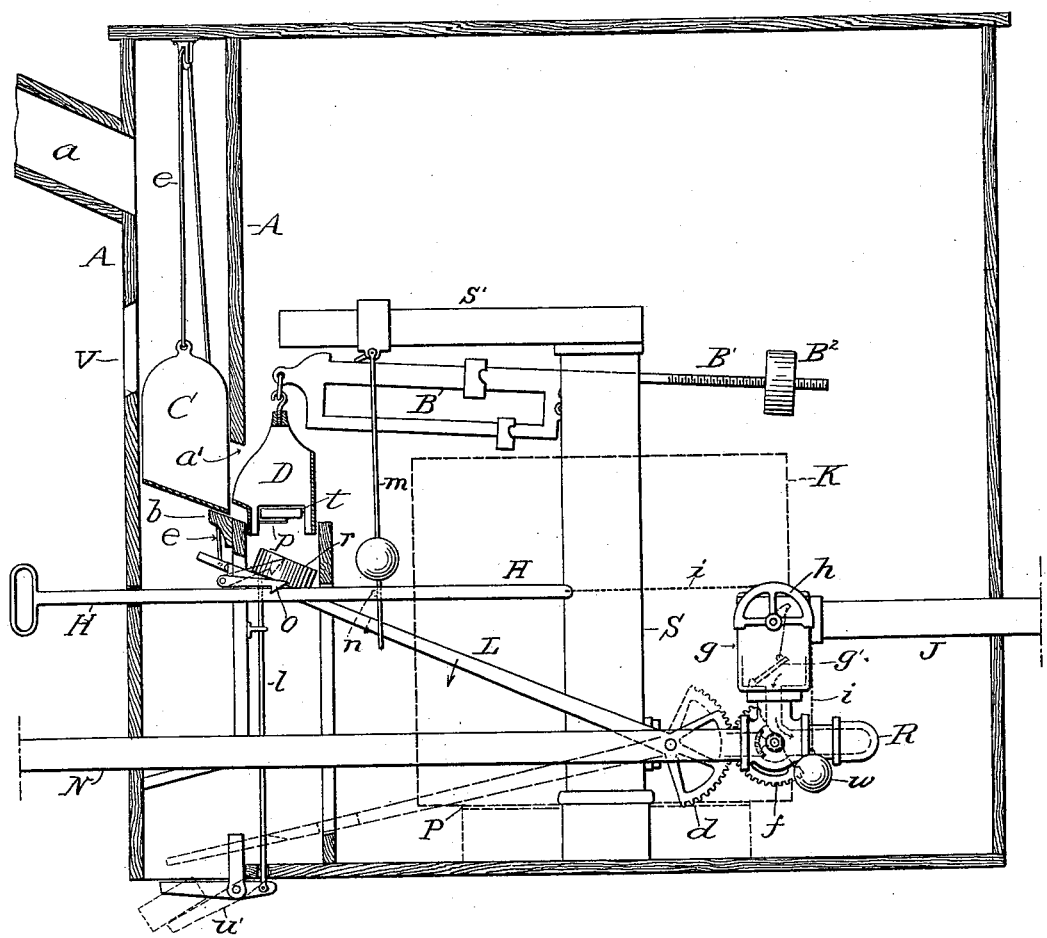
Figure 3:
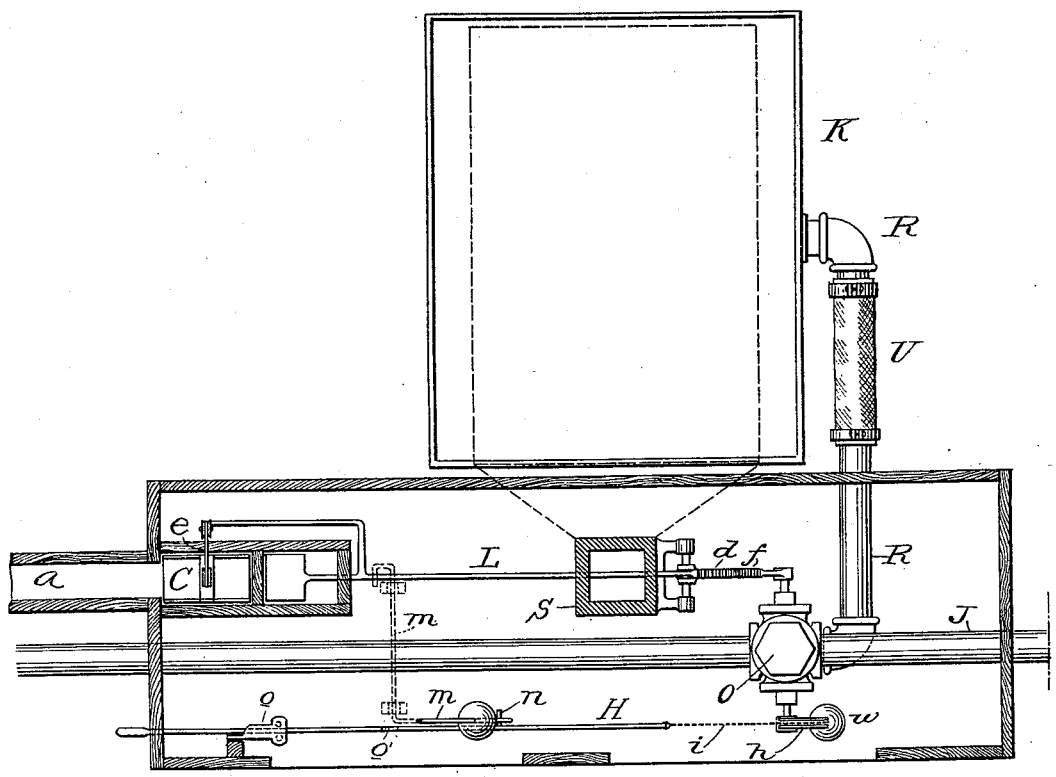
Figure 4:
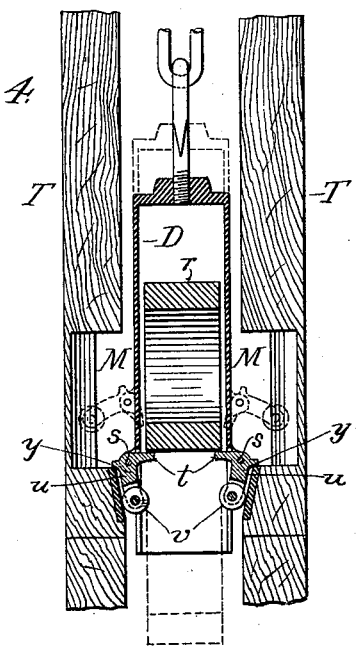

In the accompanying drawings, Figure 1 is a side elevation of the apparatus ready for use with the tank empty. Fig. 2 is a similar view showing the same with the tank filled. Fig. 3 is a top plan view, partly in section, and Fig. 4 is a vertical section of the weight-receiver, enlarged in order to show the details of its construction. Fig. 5 is a side and edge view of the weights used.

It is customary at creameries for parties to bring their supply of milk, have it run through the separator to remove the cream, which is retained for making butter, and then take home with them their proportion of the skimmed milk for use on the farm, it being customary to determine the quantity by weight instead of by liquid measure.

The operation of giving to each party his share of the skimmed milk is attended with much labor and often with dissatisfaction, and it is to remedy these difficulties that the present invention is designed. To accomplish the desired result, I construct an apparatus as follows:

I first provide a platform-scale, of which, in Figs. 1 and 2, P indicates the platform, S the upright or standard, and S' the top bar or arm. The scale-beam B is provided with a rearwardly-projecting arm on which is mounted an adjustable weight $B^2$ to balance the weight of the receiving-can K, which sits on the platform of the scale. The milk, after being passed through the separator, is pumped up into a reservoir (not shown) located at such a height that the milk will flow by gravity through pipe J into the receiving-tank K on the scale. In order to regulate the flow of the milk from the supply-tank, first to the receiving-tank on the scale, and then from the receiving-tank to the cans of the customer in the wagon or other conveyance outside, I arrange a three-way cock or valve O in the pipe J, which leads from the supply-tank to the receiving-tank K, and connect therewith also a delivery-pipe N, which latter terminates outside of the building, as represented in Figs. 1, 2, and 3.

In order to permit the receiving-tank K to rise and fall with the platform of the scale, a section of flexible pipe or hose U is inserted in the pipe R, which connects the three-way valve with the receiving-tank K, as shown in Fig. 3, or the whole of said pipe R, except the connections at its ends, may be flexible; or, in lieu of the flexible pipe, the pipe R may be provided with ball-and-socket joints or with swivel joints, both being well known, and therefore not necessary to show or describe, the sole object being to provide for the slight movement of the tank K caused by the rising and falling of the platform in the act of weighing the milk. To automatically operate this three-way valve K, I secure to the stem of the valve, outside of its case, a pinion or segmental rack $f$, Figs. 1 and 2, which meshes with a segmental rack $d$, attached to the end of a pivoted lever L, the opposite end of said lever extending to a point below the front end of the scale-beam B, as shown in Fig. 1.

To the front end of the scale-beam B, I secure a box or weight-receiver D, constructed as shown in the enlarged vertical sectional view, Fig. 4, this view being taken through the center at right angles to Figs. 1 and 2. It consists of a box open at its outer side or edge to permit a weight to roll freely into it, as indicated in Fig. 1, where the weight is shown in the box in dotted lines. At its bottom, which is also open, on each side is pivoted a leaf or plate $t$, these plates projecting inward far enough to provide a support for the weight $r$, as shown in Fig. 4. Each plate is provided with a depending arm $u$, preferably carrying at their lower or free ends a friction-roller $v$, as shown. On their outer sides they are also provided with shoulders or projections $y$, which serve as stops to limit the movement of the receiver. This receiver D moves up and down in a case T, in the inner walls of which recesses M are made for the arms $u$ to swing into when the plates $t$ are tipped by the weight $r$, as shown in dotted lines in Fig. 4, and which can only occur when the scale-beam rises and draws the receiver up to the position indicated by the dotted lines in Fig. 4. In order to insure the return of the plates $t$ to a horizontal position after they have been tipped by the passage of the weight $r$, I make the arms $u$ sufficiently heavy to overbalance the plates $t$, so that as soon as the weight has dropped through between the hinged plates they will at once swing back to the horizontal position. It is obvious that springs may be used for this purpose, but a weight is more reliable and therefore preferable. This receiver D, as shown in Figs. 1 and 2, is directly over the end of lever L, so that as the weight $r$ drops from the receiver it falls upon the end of the lever L and carries it down to the position shown in full lines in Fig. 1 and by dotted lines in Fig. 2, thereby operating the three-way valve O. This valve is so arranged that when the lever is up it opens the passage in pipe J from the supply-tank and permits the milk to flow through pipe R to the receiving-tank K on the scales, and as soon as the required quantity of milk has entered the receiving-tank to balance or overbalance the weight on the scale-beam (and which of course will have been previously set to weigh the required quantity) the scale-beam rises, lifting the weight-receiver, which permits the weight $r$ to drop through upon the lever L, carrying it down to the position shown in Fig. 1, thereby moving the three-way valve so as to shut off the supply from the main or supply tank and open the passage to the delivery-pipe N, when the milk is free to run from the receiving-tank on the scales to the cans of the customer outside.

In the drawings I have shown the pipe J from the supply-tank as connected with a case $g$, which has in its bottom an ordinary flap-valve $g'$, which is lifted by being connected to a crank-arm on a shaft passing through the case, this shaft having secured to it, outside of the case, a pulley or segment $h$, to which is fastened a chain $i$, which carries at its lower end a weight $w$ to turn the shaft, so as to close the valve, while the opposite end of said chain is connected to a rod H, which extends out through the wall of the building, where it can be reached by the party who is to receive the milk, as shown in Figs. 1 and 2. This rod $h$ is provided with a notch $o'$, in which a pivoted latch or dog $o$ engages when the rod is drawn out, as shown in Fig. 2, and which holds the rod out, and consequently the valve $g'$ open, until the weight $r$, falling on lever L, carries it downward, when the weight rolls off of lever L upon a pivoted lever $u'$ at the floor, this lever $u'$ being connected by a rod $l$ to the latch $o$, which is thereby thrown out of engagement with the rod H, when the weight $w$ immediately closes the valve $g'$. The principal object of using this supplementary valve is to prevent leakage of the milk from the supply-tank, as it is found difficult to make the three-way valve work sufficiently easy to be operated by the weights $r$, and yet be tight. It is therefore obvious that this supplementary valve may be dispensed with by constructing the three-way valve with the accuracy required to prevent leakage, in which case the rod H would be needed only to operate the crank-rod $m$, which locks the scale-beam, as described below.

To prevent the scale from being operated until the rod H is drawn out, I pivot a crank-rod $m$ so that its shorter arm will rest over the scale-beam B, and prevent it from rising before the rod is drawn out, the rod $m$, which has a weight on it, being held in an inclined position by a pin $n$ on rod H when the latter is shoved or drawn inward, thereby throwing the shorter end of rod $m$ down upon or close to the scale-beam, as shown in Fig. 1; but when the rod H is drawn outward the rod $m$ is released, and swinging to a perpendicular position the short arm is raised, thereby permitting the beam to rise, as represented in Fig. 2.

The weights $r$ are fed to the receiver D, one at a time, by rolling them into an inclined chute $a$, there being opposite this chute a box C, which is suspended by a chain or cord $e$, which passes over a pulley above, and has its opposite end attached to the lever L, as shown in Figs. 1 and 2, so that whenever the lever is depressed this box C is drawn up opposite the chute $a$, ready to receive a weight, as shown in Fig. 1. The descent of this box C is limited by a bracket or projection $b$, which stops it at the proper point to permit the weight $r$ to roll from it into the receiver D, the box C being open at its opposite faces, so as to permit the weight to roll in when up and out when down, the casing in which the box moves preventing the weight from escaping until it arrives at the proper point, where a hole $a'$ is made in the casing to permit the weight to roll from the box C into the receiver D, as shown in Fig. 1.

To prevent using two weights at once, either fraudulently or by accident, an opening V is made in the outer wall of the casing, and as the size of the weights and of the box is such that two weights cannot rest side by side in the box, but must rest one upon the other, the upper one being at the outer edge, because of the inclined bottom of the box causing the one first put in to roll down against the casing at the inner side, it follows that as soon as the box comes opposite the opening V the upper weight will roll out through the same, when it can be recovered and used properly. These weights will be made in the form of a ring or perforated disk, all of the same external diameter and thickness, but of different weights, by making the central perforation or hole of various sizes, as shown in Fig. 5. In this way they can be made of weights to represent five, ten, fifteen, or any number of pounds required, and thus by using a single weight of the proper thickness of ring any desired number of pounds of milk can be drawn up to the full capacity of one or more cans. To the end of the delivery-pipe N will be attached a section of hose provided with a cock or valve to shut off the flow while moving it from one can to another, but as this is a device in common use at creameries it is not shown.

From the foregoing description it will be seen that it is only necessary as each customer delivers his milk at the creamery for the person in charge to deliver to him such number and size of the weights $r$ as will correspond with the quantity of skimmed milk to which he is entitled. The party thus provided with these weights simply drives his vehicle to the side of the building where the delivery-pipe N projects, and placing the end of the hose in a can rolls one of the weights into the chute $a$ and pulls out the rod H, which permits the milk to flow first from the supply-tank into the receiving-tank K on the scales and from thence through the delivery pipe N into his cans, and thus each party obtains exactly his proportion of the skimmed milk and no more.

The operation being automatic saves the labor of one or more attendants, and as all use the same kind of weights all difficulty or question as to each obtaining his proper share is avoided.

It is of course obvious that the milk may be pumped or poured direct into the receiving-tank, in which case the pipe J, that connects the supply-tank with the valve-chamber, may be omitted, and in which case the three-way valve may also be omitted, a simple outlet-valve being substituted, in such case the scales and the weights operating in the same manner as when the supply-tank is used. As, however, that would require the attendance of another person, and as the supply-tank is generally used at the creameries, the apparatus will ordinarily be used in connection with a supply-tank, as above described.

Having thus fully described my invention, what I claim is—

1. In combination with weighing-scales, provided with a receiving-tank having inlet and outlet pipes arranged to operate as described, the three-way valve O, the pivoted lever L for operating said valve, and the weight-receiver D provided with trips for releasing the weight when the scale-beam rises, whereby the weight is caused to operate the valve automatically, substantially as and for the purpose set forth.

2. The combination in a milk-weighing apparatus, of a weighing-scale provided with a receiving-tank, a delivery-pipe connected with said tank, a valve for opening and closing said pipe, a lever arranged to operate said valve, and a weight-receiver attached to the beam of the scale adapted to receive a weight and drop the same upon the valve-operating lever when the scale-beam rises, substantially as and for the purpose set forth.

3. In combination with the receiving-tank and scale, the pipes J, R and N with the three-way valve O, and supplemental valve $g'$ with its operating-rod H and counterweight $w$, all arranged to operate substantially as shown and described.

4. In combination with the supplemental counterweighted valve $g'$, the rod H and dog $o$ arranged to engage with said rod, and the pivoted lever $u'$ connected to said dog, substantially as shown, whereby the falling weight is caused to release the rod and permit the valve to close, as set forth.

5. The combination in a milk-weighing apparatus, of a receiving-tank mounted on a scale and provided with a delivery-pipe and valve, a device for locking the beam of said scale arranged to be thrown out of its locking position by the movement of the valve-opening rod H, substantially as shown and described.

6. The combination in a milk-weighing apparatus of the valve-operating lever L and the weight-box C connected thereto, substantially as shown, whereby the movement of the box with a weight therein will raise the lever to open the valve, and the falling of a weight upon the lever will close the valve and return the box to position for the reception of another weight.

7. The combination in a milk-weighing apparatus, of the vertical case A provided with a chute $a$, for the entrance of the weights, and an opening $a'$ for the passage therefrom of the weights to the weight-receiver attached to the scale-beam, and the box C having an inclined bottom and openings at its front and rear edges, with means for moving said box up and down for the purpose of releasing and transferring the weights successively to the weight-receiver attached to the scale-beam, as set forth.

8. In combination with the vertically-reciprocating weight-box C, the casing A provided with the chute $a$ and the opening V, for the automatic escape of an extra weight in case one be accidentally or otherwise placed in the box.

9. The weight-receiver consisting of a box open at one side to permit a weight to roll therein, the hinged plates $t$ provided with the arms $u$ for holding the weight until said arms are released by the movement of the receiver as set forth.

10. In combination with the weight-receiver provided with the hinged plates $t$ provided with the arms $u$, the casing T provided with recesses M in its inner walls to permit the arms to swing outward as the receiver is raised and release the weight as set forth.

In witness whereof I hereunto set my hand in the presence of two witnesses.

DAVID W. CURTIS.

Witnesses:
L. GOSSELIN,
H. H. CURTIS.